United States Patent [19]
Hwang

[11] Patent Number: 5,545,244
[45] Date of Patent: Aug. 13, 1996

[54] CONTROL FOR GLASS FORMING MACHINE

[75] Inventor: David K. Hwang, Storrs, Conn.

[73] Assignee: Emhart Inc., Newark, Del.

[21] Appl. No.: 355,394

[22] Filed: Dec. 13, 1994

[51] Int. Cl.⁶ .............................. C03B 9/40; G06F 15/46
[52] U.S. Cl. ...................... 65/160; 65/158; 65/DIG. 13; 364/473.01
[58] Field of Search ................................ 65/29.1, 29.11, 65/29.12, 158, 160, 163; 364/473, 476

[56] References Cited

U.S. PATENT DOCUMENTS

| | | | |
|---|---|---|---|
| 4,108,623 | 8/1978 | Cardenas-Franco | 65/163 |
| 4,705,552 | 11/1987 | Liska et al. | 65/158 |
| 5,279,636 | 1/1994 | Waters | 65/158 |
| 5,425,794 | 1/1995 | Frederick et al. | 65/160 |

*Primary Examiner*—Donald E. Czaja
*Assistant Examiner*—Calvin Padgett
*Attorney, Agent, or Firm*—Spencer T. Smith

[57] ABSTRACT

A control for a glass forming machine having at least one controlled mechanism which will generate position feedback signals representative of its position, comprising control profile means for generating a profile for each mechanism to be controlled, means for transforming the profile either into control signals for the mechanisms to be controlled or into simulated position feedback signals, a screen, and display means for receiving either the position feedback signals or the simulated position feedback signals and for generating display signals for the screen, and means for commanding operation either in a machine mode wherein the transforming means will transform the profile into the control signals and the display means will receive feedback position signals from the controlled mechanisms or in a simulation mode wherein the transforming means will transform the profile into the simulated feedback position signals and the display means will receive the simulated positoin feedback signals.

6 Claims, 5 Drawing Sheets

Fig_3

CONTROL FOR GLASS FORMING MACHINE

The present invention relates to machines such as H-28 or I.S. (Individual Section) machines which form glass containers and other were from individual gobs of molten glass and, more particularly, to control systems for such machines.

Glass forming machines receive individual gobs of molten glass and form them in either a press and blow or a blow and blow process into the finished container. During a cycle of operation one or more devices will be displaced by an actuator (which may be profiled such as a servo or stepper motor drive) and the position of the devices will be monitored by a transducer (linear, rotary, etc.) which will supply position feedback signals to error checking software. Where displacement is within acceptable limits (distance, velocity, acceleration) the position of the device can be graphically shown on an operational screen. When an error exists, it also can be graphically displayed.

It is an object of the present invention to provide such a system that can graphically display this information whether or not machine mechanism are actually being controlled.

Other objects and advantages of the present invention will become apparent from the portion of this specification and from the accompanying drawings which illustrate in accordance with the mandate of the patent statutes a presently preferred embodiment incorporating the principles of the invention.

Referring to the drawings.

Figure 1:
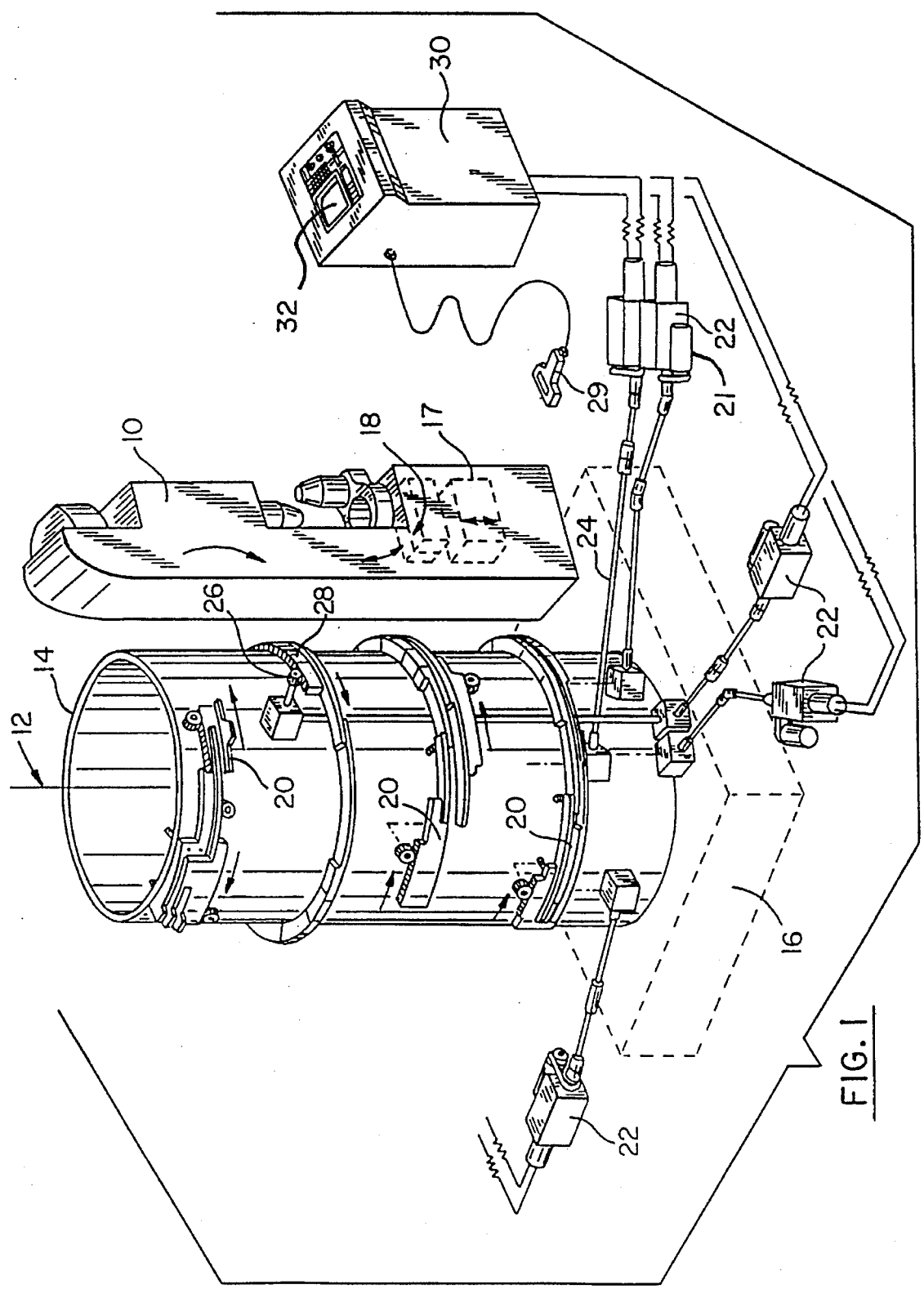
FIG. 1 is a schematic representation of an H-28 machine.

In an H-28 machine, a plurality of sections 10 rotate around the vertical axis 12 of a timing drum 14 which is supported by the machine base 16. Each section makes glassware each revolution. A gob of molten glass is delivered to a blank mold 17 (which is shown schematically in FIG. 1 at its down position). The blank mold then rises to its up position and the gob is pressed in the blank mold to from a parison. The blank mold is lowered to the down position while the parison is held in position and blow molds 18 are displaced to a closed position (schematically shown in FIG. 1) around the parison so that the parison can be blown into the final ware.

The operation of these devices is controlled by mechanical cams 20 which are secured to the drum for limited movement along their annular track and displacement of these cams is effected by driving stepper motors of stepper motor assemblies 22, (FIG. 1) which are connected via drive trains 24 ending with a drive pinion 26 to a gear 28 on the associated cam. An operator makes desired changes via a hand held terminal 29 or from the console 30 which includes a computer and an operational screen The stepper motor assembly 22 includes the cropper motor 23 and encoder 21 for supplying positional data to the computer.

Figure 2:
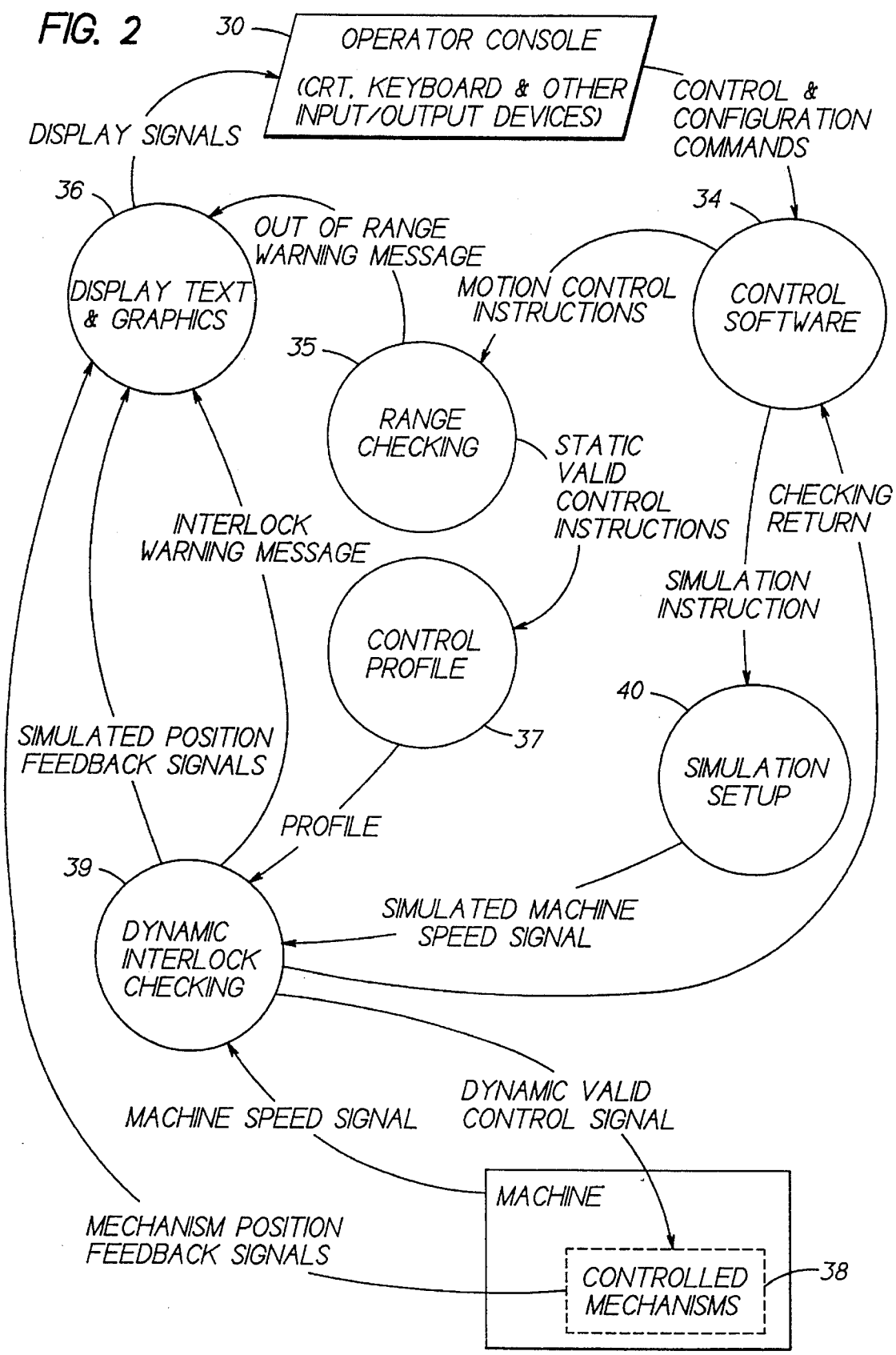
FIG. 2 is a process control and simulation diagram for such machine.

To operate the machine (FIG. 2) an operator using a CRT, inputs Control and Configuration Commands to the Control Software 34. If the system is to be operated in the Machine Mode as commanded by the operator, the Control Software will issue Motion Control Instructions to Range Checking software 35 which will determine whether the instructed motion is within acceptable limits. If the instructed motion is beyond these limits the Range Checking Software 35 will issue an Out of Range Warning Message to the Display Text and Graphics software 36 which will supply Display Signals to the screen 32. If the instructed motion is within these limits the Range Checking software 35 will issue Static Valid Control instructions to the Control Profile software 37 which will issue a profile for a specific Controlled Mechanism 38 to be displaced. The Control Profile (which could also be identified as a motion profile generator) includes in memory an algorithm suitable for generating a series of pulses having different frequencies and durations for driving each of the stepping motors. If servo motors replaced the stepping motors, this algorithm would, operating either at the displacement profile level or at the velocity profile level, generate a series of digital values which once converted to analog form would drive the servo motors.

Where two of the machine mechanism (for example, the blank mold and the blow mold) can occupy the same space and are supposed to sequentially occupy this space without striking the other mechanism, the present machine will prevent such interference. The Dynamic Interlock Checking software 39 determines the angle of the blank mold down cam and the angle of the blow mold closed cam and calculates the angle of separation. Since the blank mold down mechanism has a fixed time duration whereas the blow mold closed mechanism has a fixed angle duration, a change in Machine Speed may result, in the establishment of an interference between these mechanisms. The Dynamic Interlock Checking software 39 receives the Machine Speed signal and calculates the minimum separation angle and compares this minimum angle with the selected angle and rejects this selected value if the actual separation is less than the minimum allowable separation.

Conversely, if the operator wants to change to a new machine speed without changing the cam angle sottings, the Dynamic Interlock Checking software 39 will calculate the machine speed possible using the existing cam settings. It will then compare the new machine speed to the current machine speed. If interference is not found then the computer will output a speed change command to the table drum motor. If interference is found then the new machine speed will be rejected and an Interlock Warning Message will be sent from the Display Text and Graphics Software 36 which will issue suitable display signals to the screen. Further details of this technology are disclosed in U.S. Pat. No. 5,122,179.

Where no interference is found the Dynamic Interlock Checking software 39 transforms the Profile Signals into Dynamic valid Control Signals for the Controlled Mechanisms 38. Each stepper motor drive has a position transducer (encoder 21) which issues Mechanism Position Feedback Signals which represent the position of the cam being displaced. These signals are transformed by the Display Text and Graphics software into Display Signals which are directed to the operation console.

Alternately, the operator may operate the system without operating the Machine (the machine may not be present) by issuing a Configuration Command operate in the Simulation Mode. In the Simulation Mode the Dynamic Interlock Checking software 39 will not receive a Machine Speed Signal. Instead, the Control Software 34 will issue a Simulation Instruction to the Simulation Setup software 40 which will generate a Simulated Machine Speed Signal for the Dynamic Interlock Checking software 39. With the system operating in the Simulation Mode the Profile Signals will be transformed into Simulated (software generated) Position Feedback Signals which are then supplied to the Display Text and Graphics.

Figure 3:
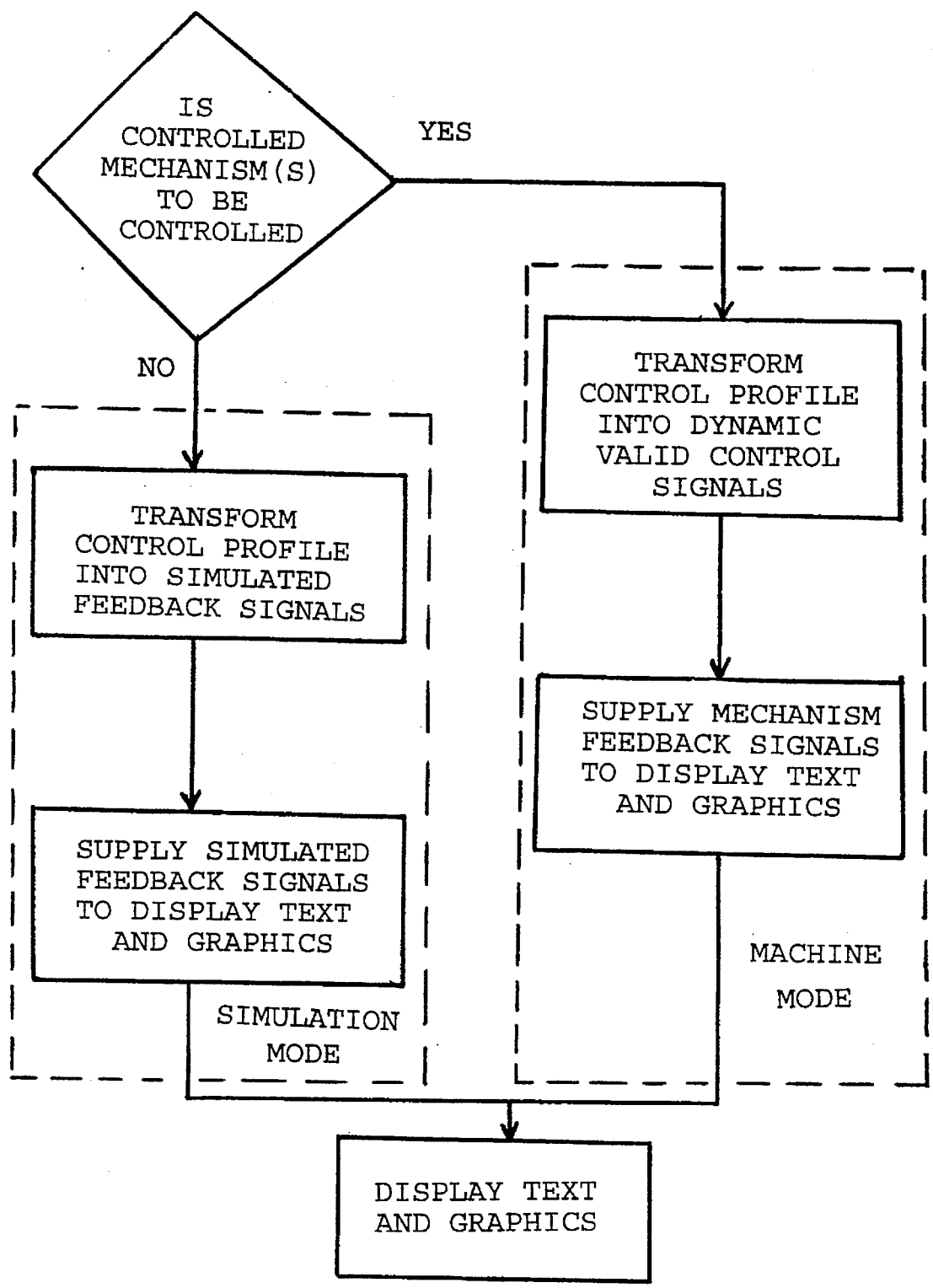
FIG. 3 is a flow chart diagram illustrating the operation of the Control Software shown in FIG. 2.
Figure 4:
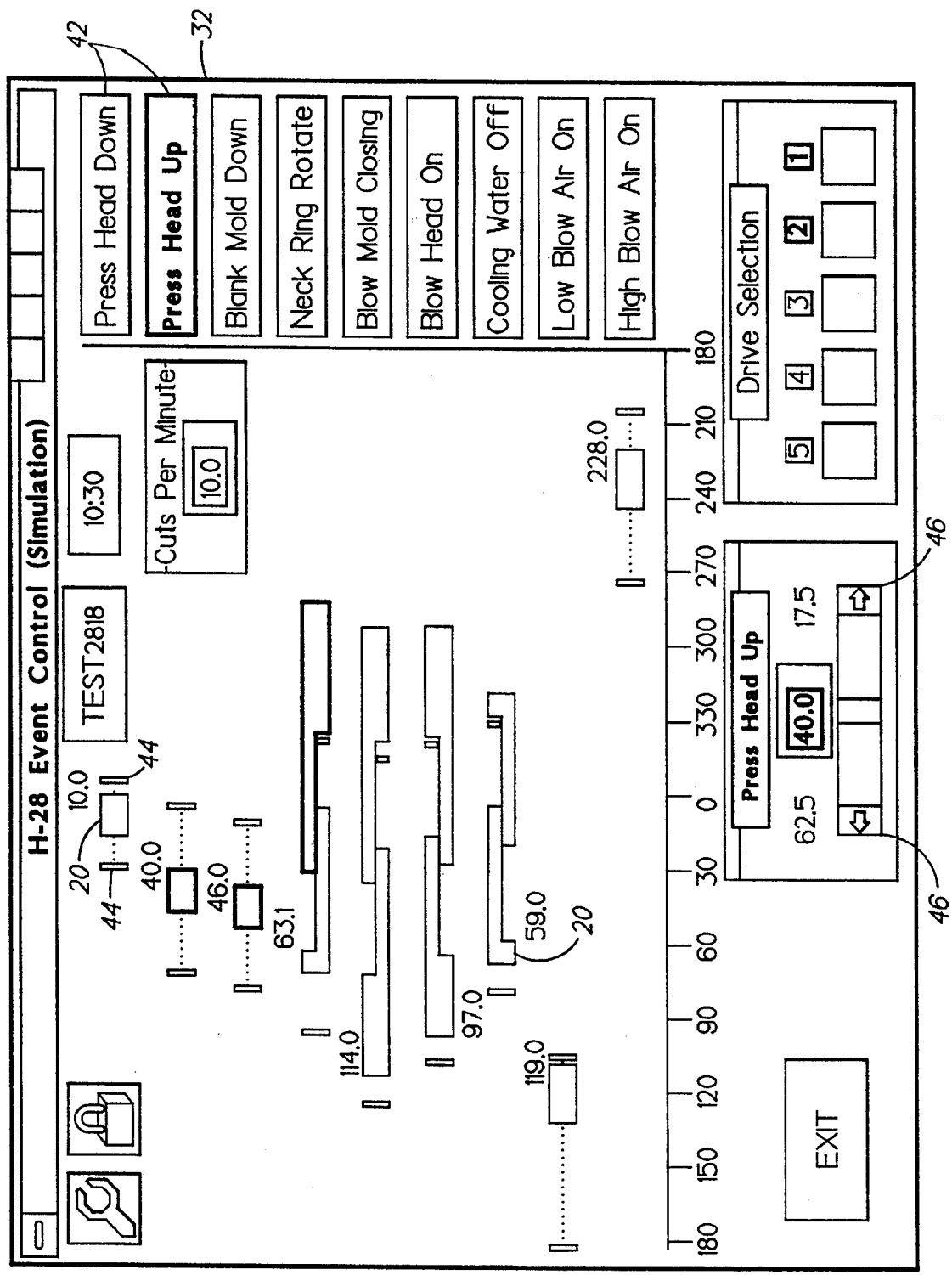
FIG. 4 is a graphic screen showing the location of eight control cams of the machine shown in FIG. 1.
Figure 5:
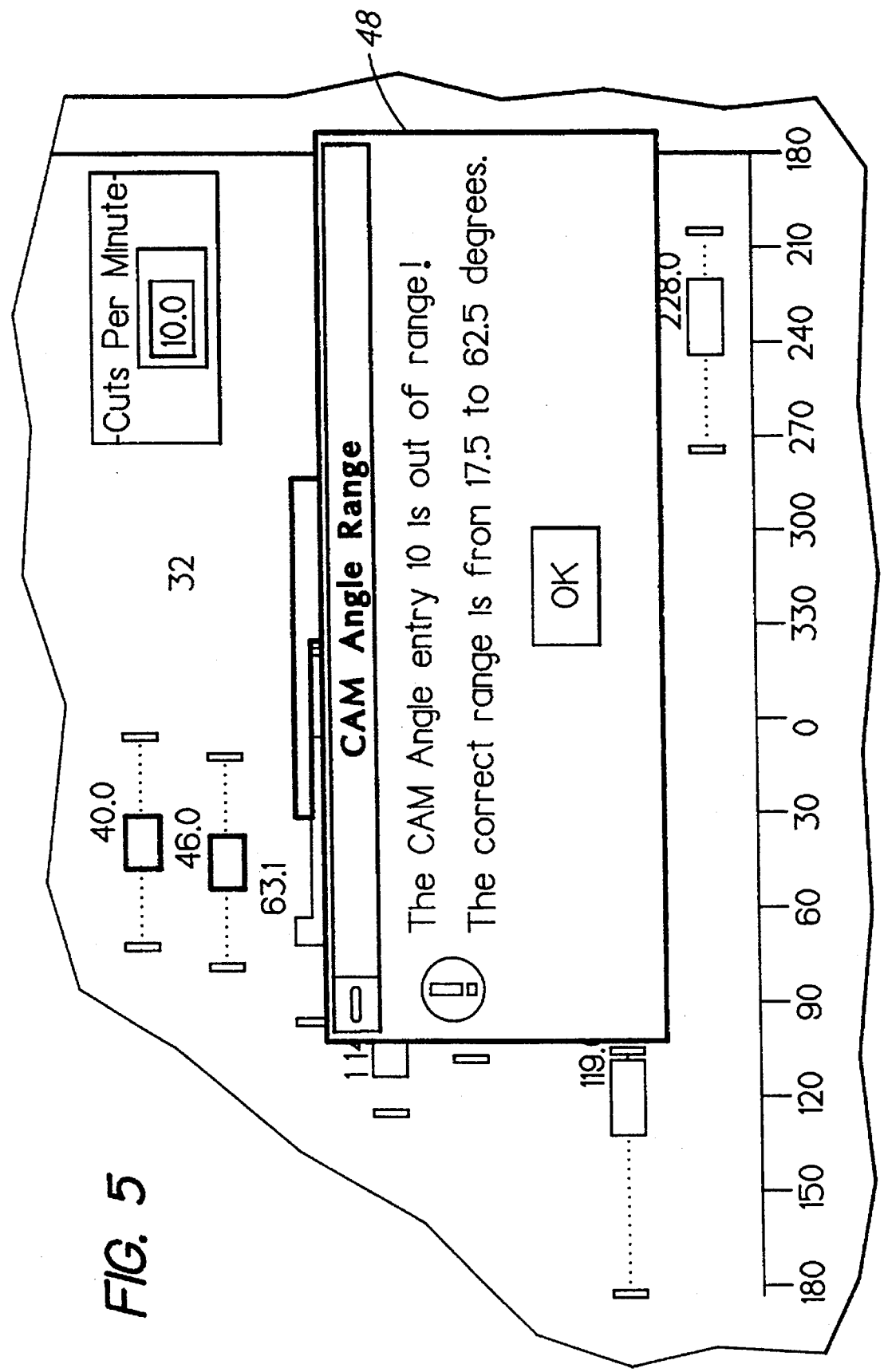
FIG. 5 is a view similar to that of FIG. 3 with a warning message presented on the screen.

The events 42 to be controlled are listed at the right side of the operational screen illustrated in FIG. 3. For each event an associated cam must be located so that the event will take place at the correct time. A cycle equates to 360° and accordingly, time equates to degrees. In the listed events Blow Mold Closing and Blow Head On the associated cams will operate mechanical mechanisms such as a linkage, whereas, in the other listed events, the associated cams will operate valve mechanisms. Each cam 20 is graphically displayed on the screen 32 as are the programmed limits 44 of their displacement. The limits (17.5 and 62.5) for Press Head Up and the setting 40.0 for Press Head Up are graphically displayed at the bottom of the screen as are operator controls 46 for changing the setting. In the event the operator inputs a setting that is beyond the acceptable limits, a warning message 48 (FIG. 4) will be graphically presented. As shown, the warning message states that the cam angle entry is out of range and the correct range is set forth.

Also shown at the bottom of the operational screen are five drives which correspond to the five stepping motors shown in FIG. 1 (three of the eight cams are linked with the other five cams for conjoint displacement).

In either mode the operational screen and user interface will appear and function almost identically. The only exception is when in simulation, the screen would display something (text or graphics) to inform the operator of the Simulation Mode. This means that if the software is downloaded into the machine computer it can operate the Controlled Mechanisms. If, on the other hand, the software downloaded into a console which is not connected to the machine, having a compatible operational screen, the operational screen will function as if the software was in fact controlling the Controlled Mechanisms, even though they are not present (or not operating). The operational screen will appear and function as if Controlled Mechanisms are being controlled. This permits an actual machine to be intellectually taken into a training room or the like.

I claim:

1. A control for a glass forming machine having at least one displaceable mechanism which will generate position feedback signals representative of its actual position, comprising control profile means for generaging a profile for controlling the displacement of said displaceable mechanism, means for transforming said profile either into control signals for said mechanism whereby said mechanism will be displaced or into simulated position feedback signals with said mechanism not being displaced, a screen, and display means for receiving either the position feedback signals or the simulated position feedback signals and for generating mechanism position display signals for said screen, and means for commanding operation either in a machine mode wherein said transforming means will transform said profile into said control signals and said display means will receive feedback position signals from the displaced mechanism or in a simulation mode wherein said transforming means will transform said profile into said simulated feedback position signals and said display means will receive said simulated position feedback signals.

2. A control for a glass forming machine according to claim 1, wherein said mechanism is displaceable between set limits and wherein said display means further comprises means for displaying said limits on said screen.

3. A control for a glass forming machine according to claim 2, wherein said display means further comprises means for displaying the location of said mechanism relative to said limits.

4. A control for a glass forming machine according to claim 3, further comprising means for issuing motion control instructions for said displaceable mechanism, means for determining whether the motion instructed is beyond said limits and said display means further comprises means for displaying on said screen a warning message presenting said instructed motion and the correct range of displacement for said mechanism.

5. A control for a glass forming machine according to claim 1, wherein said transforming means can receive machine speed signals from the glass forming machine.

6. A control for a glass forming machine according to claim 5, further comprising means for generating simulated machine speed signals and delivering said signals to said transforming means, wherein when said control is operating in the machine mode said transforming means will receive machine speed signals and wherein when said control is operated in the simulated mode said transforming means will receive simulated machine speed signals.

* * * * *